UNITED STATES PATENT OFFICE.

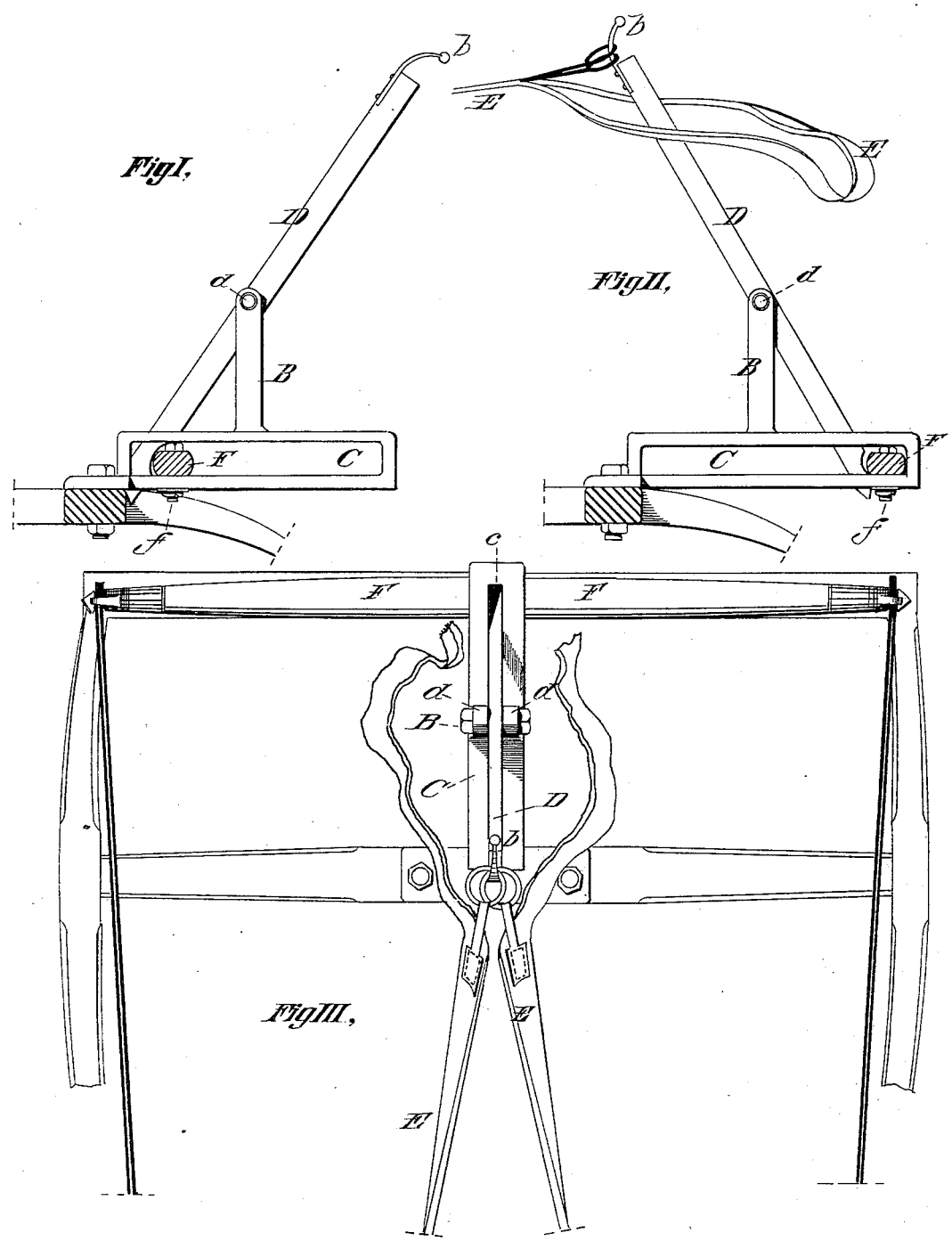

EDWARD R. BOWERS, OF SPRINGFIELD, MASSACHUSETTS, ASSIGNOR OF ONE-HALF TO FRANK H. ADKINS, OF HARTFORD, CONNECTICUT.

VEHICLE DEVICE FOR CHECKING HORSES.

SPECIFICATION forming part of Letters Patent No. 259,354, dated June 13, 1882.

Application filed March 11, 1882. (No model.)

*To all whom it may concern:*

Be it known that I, EDWARD R. BOWERS, a citizen of the United States, residing at Springfield, in the county of Hampden and State of Massachusetts, have invented new and useful Improvements in Devices for Preventing Horses from Moving with Vehicles, of which the following is a specification.

This invention relates to an improved device for preventing a horse harnessed to a vehicle from going off with it when left unattended; and it consists, in brief, of a combined sliding whiffletree and hinged rein-holder arranged to operate for that purpose, as hereinafter fully set forth.

Figure I is a side elevation of my device with the lever and whiffletree in one position. Fig. II is the same with the whiffletree and lever in a different position and the reins attached and Fig. III is a plan view with the movable parts in the position shown in Fig. II.

The arm D is hinged at $d$ in the upright bearing B from the frame C, and while its upper end is provided with a convenient hook, $b$, over which to catch the reins E, its lower end is free to swing in the frame C through the longitudinal slot $c$. The slot $c$ also permits the passage of the bolt $f$ from the whiffletree F, and a washer and nut upon the bolt $f$, coming against the bottom face of the frame C holds the whiffletree to the frame, while permitting it to slide within it as well as oscillate. The whiffletree F, contained in the frame C, as shown, is stopped at one end of its slide by the frame itself, as in Fig. II, and at the other end by the lower end of arm D, resting solidly against the end of the frame, as seen in Fig. I. The frame C is solidly bolted to the whiffletree-bar, and extends back in the clear space in rear of it, as shown in Fig. III.

When the vehicle is in motion and the reins in the hands of the driver the arm D is in the position shown in Fig. I, with the whiffletree F bearing in effect against one solid end of the frame.

When the vehicle is at a standstill and it is desired to leave it the arm D is pushed by one end to bring the whiffletree to the rear end of its frame and the reins are hooked, with a greater or less tension upon the horse's mouth, to the end of the arm, in which relative position of the parts it is evident that the horse is virtually hobbled.

In order to place the point of attachment of the reins as far as possible above the center of draft of the vehicle, as well as to furnish a more convenient hook end and powerful means of receding the whiffletree to the point shown in Fig. II, I form the arm D into a lever having its upper end the longer; also, as a convenient means of securing the reins to the lever D, I provide them with rings secured in the right position upon the reins E, and fasten upon the end of the lever a hook, $b$, as shown, which, with the shoulder made by the end of the lever, forms a hook over which the reins may be dropped or withdrawn by the driver from his seat.

This device, while more particularly adapted to light one-horse carriages, may be applied with but slight modification to double teams, and by its use the horse may be left checked with any required tension, or the reins may be left so that only upon an attempt of the animal to start a pull is produced, the counterpart of which would be given under the circumstances by a person in the carriage.

Now, having described my invention, what I claim is—

The combination, with the slotted frame C, provided with the bearing B and secured to the whiffletree-bar, of the whiffletree F, held in said frame and adapted to slide therein, and the hinged lever D, arranged to have one end swing within the frame in operative contact with the whiffletree and to have its other end form a point of attachment for the reins E, provided with suitable eyes or rings to connect therewith, all operating for the purpose set forth.

EDWARD R. BOWERS.

Witnesses:
H. A. CHAPIN,
WM. H. CHAPIN.